(12) United States Patent
Ushibo et al.

(10) Patent No.: US 8,827,760 B2
(45) Date of Patent: Sep. 9, 2014

(54) PERIPHERAL APPARATUS FOR POSITIONING AND USING A PORTABLE ELECTRONIC DEVICE

(76) Inventors: Carrie Park Ushibo, Monterey, CA (US); James Kinji Ushiba, Monterey, CA (US)

( * ) Notice: Subject to any disclaimer, the term of this patent is extended or adjusted under 35 U.S.C. 154(b) by 91 days.

(21) Appl. No.: 13/304,687

(22) Filed: Nov. 28, 2011

(65) Prior Publication Data

US 2013/0137337 A1    May 30, 2013

(51) Int. Cl.
*A63H 3/00* (2006.01)

(52) U.S. Cl.
USPC ............................................. 446/73; 446/268

(58) Field of Classification Search
USPC ......... 446/71–73, 77, 81, 268, 295, 296, 297, 446/299, 302, 318, 369, 490
See application file for complete search history.

(56) References Cited

U.S. PATENT DOCUMENTS

| | | | | |
|---|---|---|---|---|
| 1,927,453 | A * | 9/1933 | Hill | 455/177.1 |
| 4,979,923 | A * | 12/1990 | Tanaka | 446/72 |
| D313,311 | S * | 1/1991 | Senitt | D3/235 |
| 5,393,257 | A * | 2/1995 | Spector | 446/27 |
| 5,489,231 | A * | 2/1996 | Leyser | 446/302 |
| 6,056,618 | A * | 5/2000 | Larian | 446/73 |
| 6,160,540 | A * | 12/2000 | Fishkin et al. | 345/184 |
| 6,196,893 | B1 * | 3/2001 | Casola et al. | 446/297 |
| 6,220,922 | B1 * | 4/2001 | Lee et al. | 446/383 |
| 6,264,521 | B1 * | 7/2001 | Hernandez | 446/73 |
| 6,264,524 | B1 * | 7/2001 | Crane et al. | 446/177 |
| 6,521,852 | B1 * | 2/2003 | Ni | 200/520 |
| 6,558,225 | B1 * | 5/2003 | Rehkemper et al. | 446/484 |
| 6,773,344 | B1 * | 8/2004 | Gabai et al. | 463/1 |
| D574,700 | S | 8/2008 | Bevirt | |
| 7,891,615 | B2 | 2/2011 | Bevirt | |
| 2003/0077978 | A1 * | 4/2003 | Beige | 446/369 |
| 2005/0176461 | A1 * | 8/2005 | Bozzone et al. | 455/551 |
| 2005/0227577 | A1 * | 10/2005 | McRae | 446/268 |
| 2007/0253580 | A1 | 11/2007 | Sutton | |
| 2007/0253581 | A1 | 11/2007 | Sutton | |
| 2010/0078536 | A1 | 4/2010 | Galvin | |

* cited by examiner

*Primary Examiner* — Nini Legesse
(74) *Attorney, Agent, or Firm* — Patrick Reilly

(57) ABSTRACT

A method and device are provided that include a support structure encased within a stuffed toy, wherein at least one of the extremities of the structure allow a user to position a portable electronic device. The portable electronic device may render digitized audio files and/or digitized video files. Versions of the toy may include a shell or case disposed between the portable device and the support structure; audio speakers; an electric battery; one or more solar energy panels that charge the battery; an electric cord that enables charging the battery from a landline power socket; a device power cord that delivers electrical power from the battery to a device; ear buds that may couple with the portable electronic device; and one or more audio speakers that emit sound derived from the portable electronic device.

20 Claims, 13 Drawing Sheets

PERIPHERAL APPARATUS FOR POSITIONING AND USING A PORTABLE ELECTRONIC DEVICE

FIELD OF THE INVENTION

The present invention relates to digital device peripheral equipment. More particularly, the present invention relates to method and devices for using and positioning an electronic video screen that renders digitally store images.

BACKGROUND OF THE INVENTION

Portable electronic devices have become increasingly affordable to the average consumer. With widespread usage that compactness and lightness of conventional digital electronic devices provide, many children in particular have had increased access to such devices and have become accustomed to near constant access to digital media. Accordingly, many parents have developed a willingness to employ devices that render audio and/or video programs to entertain, educate and occupy the attention of their child or children. However, when families are travelling, the maintenance and positioning of a portable electronic device for a child's benefit can require extra attention and effort by at least one the parents or attendant.

The prior art includes accessories for electronic devices that render audio and video files and which secure a portable media device. However, there remains and unmet for a peripheral apparatus that is attractive to a child, can maintain, secure and position a portable media device, and further ease a child's use and enjoyment of such a device. In particular, the prior art fails to provide methods or devices that optimally support the maintenance and positioning of portable electronic devices that present video screens for rendering digital files that store representations of visual images.

Accordingly, it would be advantageous to provide an apparatus and method that addresses many of the problems that have not been solved by the conventional art and more optimally supports the use and secure positioning of an electronic video screen.

SUMMARY OF THE INVENTION

Towards this object and other objects that will be made obvious in light of this disclosure, a first preferred configuration of the present invention includes a portable video device support structure encased within a stuffed toy, wherein at least one of the extremities of the structure of the toy allow a user to position a portable electronic device. The portable electronic device may be enabled render digitized audio files and/or digitized video files. Various configurations of the invented toy may include a shell or case disposed between the portable device and the support structure; one or more audio speakers, e.g., directional audio speakers; and a module or element that provides electrical power to the portable video device.

Alternate preferred embodiments of the invented device may include an electric battery; one or more solar energy panels that charge the battery; an electric cord that enables charging the battery from a landline power socket; a device power cord that delivers electrical power from the battery to a device; ear buds that may couple with the portable electronic device; and one or more audio speakers that emit sound derived from the portable electronic device.

The foregoing and other objects, features and advantages will be apparent from the following description of the preferred aspects of the invention as illustrated in the accompanying drawings.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include U.S. Pat. No. D574,700, titled "Ball and socket connector" (Inventor: Bevirt, Joeben; Issued on Aug. 12, 2008); U.S. Pat. No. 7,891,615, titled "Mounting apparatus using ball and socket joints with gripping features" (Inventor: Bevirt, Joeben; Issued on Feb. 22, 2011); United States Patent Application Publication No. 20100078536, titled "Hands-free device holder for securing hand-held portable electronic device with a screen" (Inventor: Galvin, Nicolette A.; Published on Apr. 1, 2010); United States Patent Application Publication No. 20070253580, titled "Carrying bag and portable comfort pillow having two headphone speakers thereon connected to a headset carrying" strap" (Inventor: Sutton, Joseph A.; Published on Nov. 1, 2007); and United States Patent Application Publication No. 20070253581, titled "Toy in the form of a stuffed toy or 3-D character toy having a headset carrying strap with two headphone speakers and an audio player built into one of the speakers" (Inventor: Sutton, Joseph A.; Published on Nov. 1, 2007).

The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely", "only" and the like in connection with the recitation of claim elements, or use of a "negative" limitation.

Figure 1A:
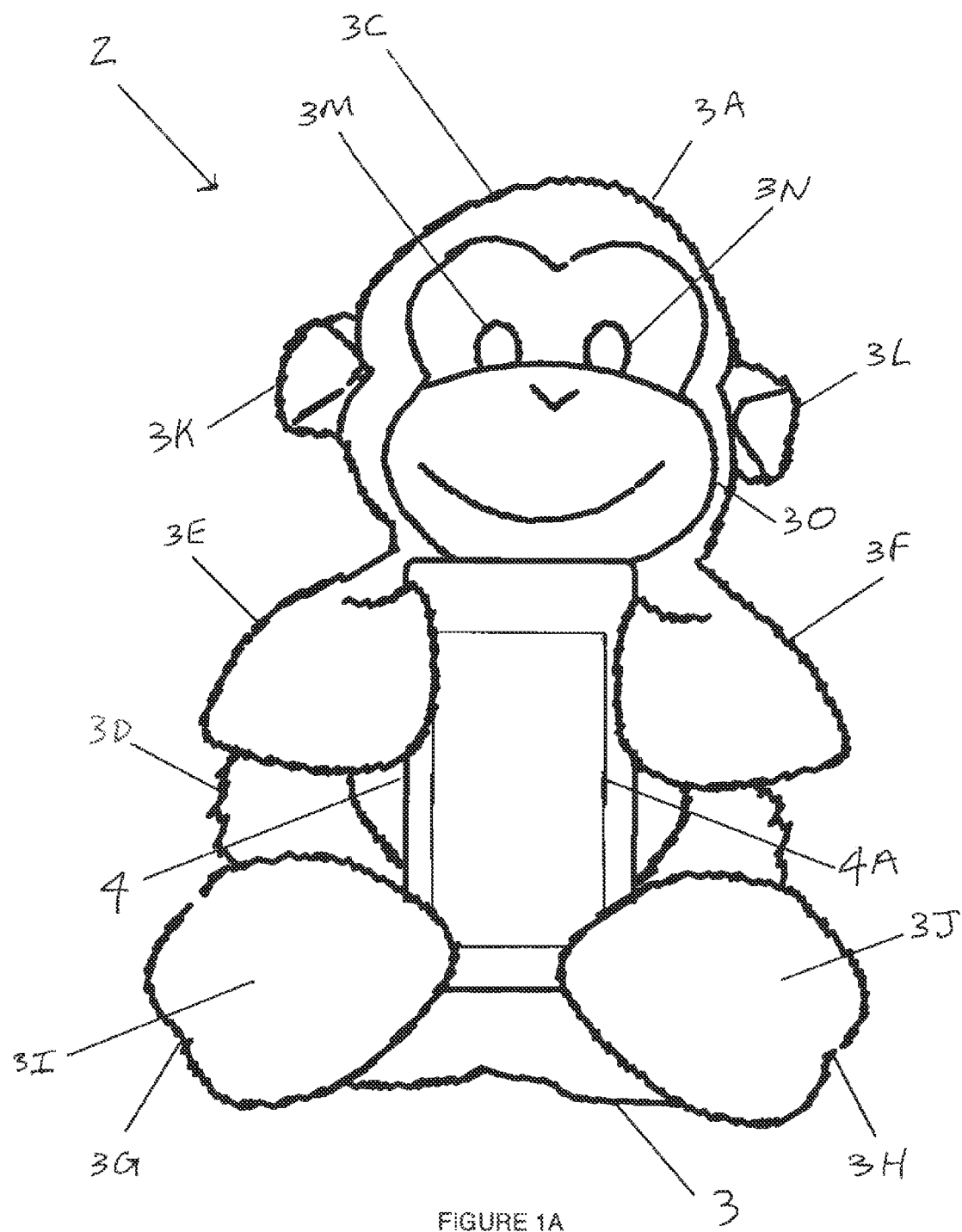
FIG. 1A presents a first version of the invented device coupled with and positioning an iPhone.

Referring now to FIG. 1A, FIG. 1A presents an exemplary first version 2 of the invented device having a figurine, wherein the first version 2 is coupled with and is applied by a user to position a cellular telephone 4 (hereinafter "phone" 4). The phone 4 may be or comprise (a.) a digital content player having a video screen 4A, such as an iPOD TOUCH 4G™ digital video display device as marketed by Apple, Inc. of Cupertino, Calif., (b.) a digital cellular telephone having a video display capability, such as an iPHONE 4S™ digital cellular telephone as marketed by Apple, Inc. of Cupertino, Calif., (c.) a MOTOROLA DROID X™ smart phone as marketed by Motorola Solutions, Inc. of Schaumberg, Ill., (d.) a MOTOROLA DROID X™ tablet computer as marketed by Motorola Solutions, Inc. of Schaumberg, Ill.; an iPAD™ tablet computer as marketed by Apple, Inc. of Cupertino, Calif.; and/or (f.) other suitable digital video display device, video-enabled telephone and/or tablet computer known in the art. While the first version 2 is described herein as adapted for holding and positioning an iPHONE™ cellular telephone, it is understood that the alternate versions of the invented apparatus may be adapted, sized and shaped to hold one or more various alternate electronic devices, such as a suitable alternate tablet computer, a cellular phone, and/or a personal digital assistant known in the art.

Figure 9:
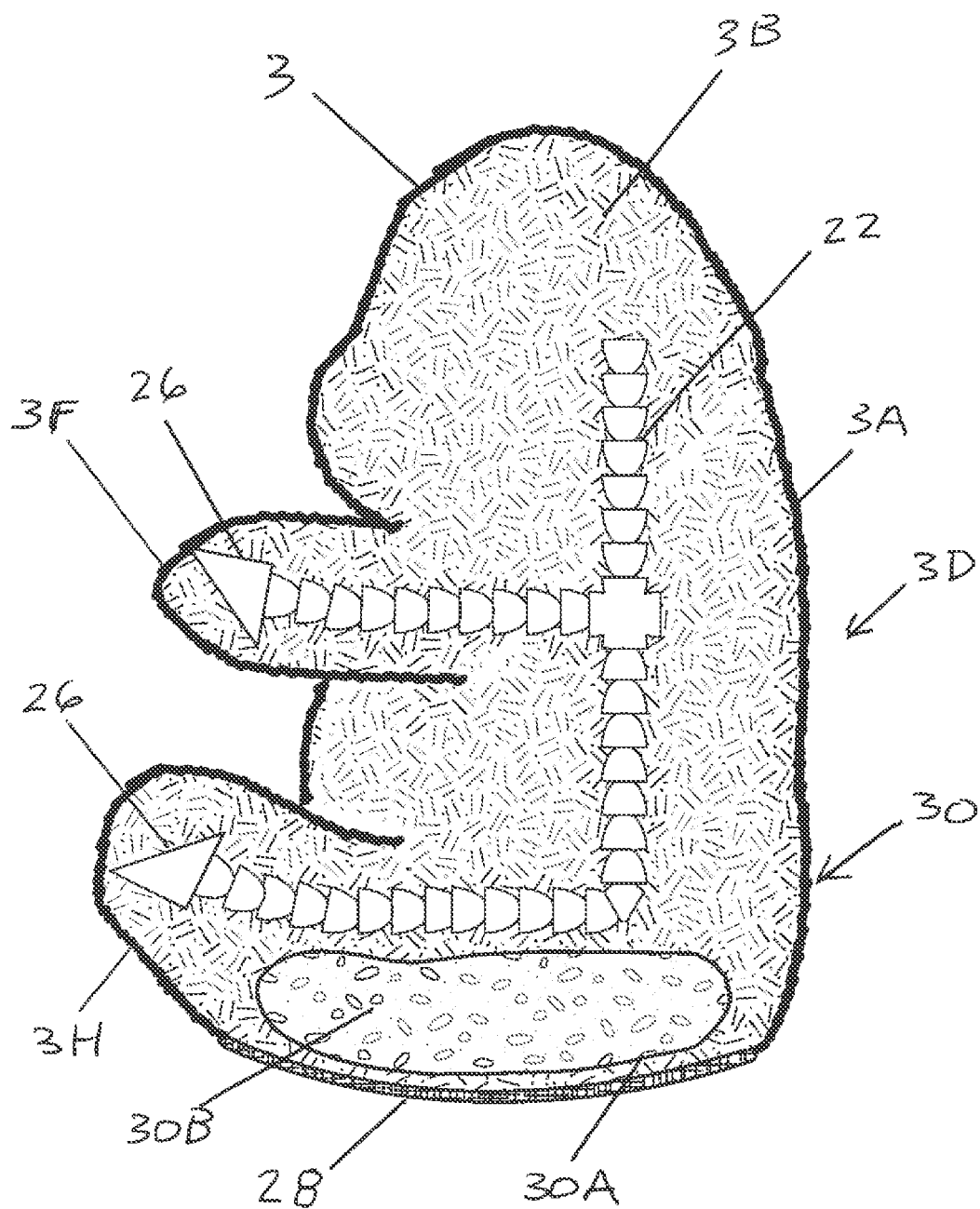
FIG. 9 is a cut-away side view of the alternate embodiment of the second version of FIG. 7 showing the four triangular-shaped corner connectors, an external high friction surface, and a weighted bag.

The first version 2 includes the three-dimensional figurine 3 made with a generally soft exterior fabric 3A, e.g., cotton, wool, rayon, or other suitable organic or inorganic material, and a internal stuffing 3B as shown in FIG. 9. The internal stuffing 3B may be or comprise cotton, cotton batting, wool, and/or other suitable organic, inorganic or synthetic material known in the art.

The shape of the figurine 3 defines a head region 3C, a body region 3D and two individual arm appendages 3E & 3F, and two individual leg appendages 3G & 3H. The two individual leg appendages 3G & 3H each include a separate footpad representation element 31 & 3J. The head region 3C presents two ear representation elements 3K & 3L, two eye representation elements 3M & 3N, and a snout representation element 3O. The first version 2 further includes the stuffing 3B that maintains the volume of at least the head region 3C, the body region 3D and the representative limb regions 3E, 3F, 3G & 3H. One or more of the limb regions 3E, 3F, 3G & 3H are adapted to secure the figurine 3 to an external object (not shown).

The stuffing 3B is positioned within the exterior fabric 2A and may be or comprise a soft material, e.g., cotton, wool, rayon, or other suitable organic, inorganic or synthetic material.

Figure 1B:
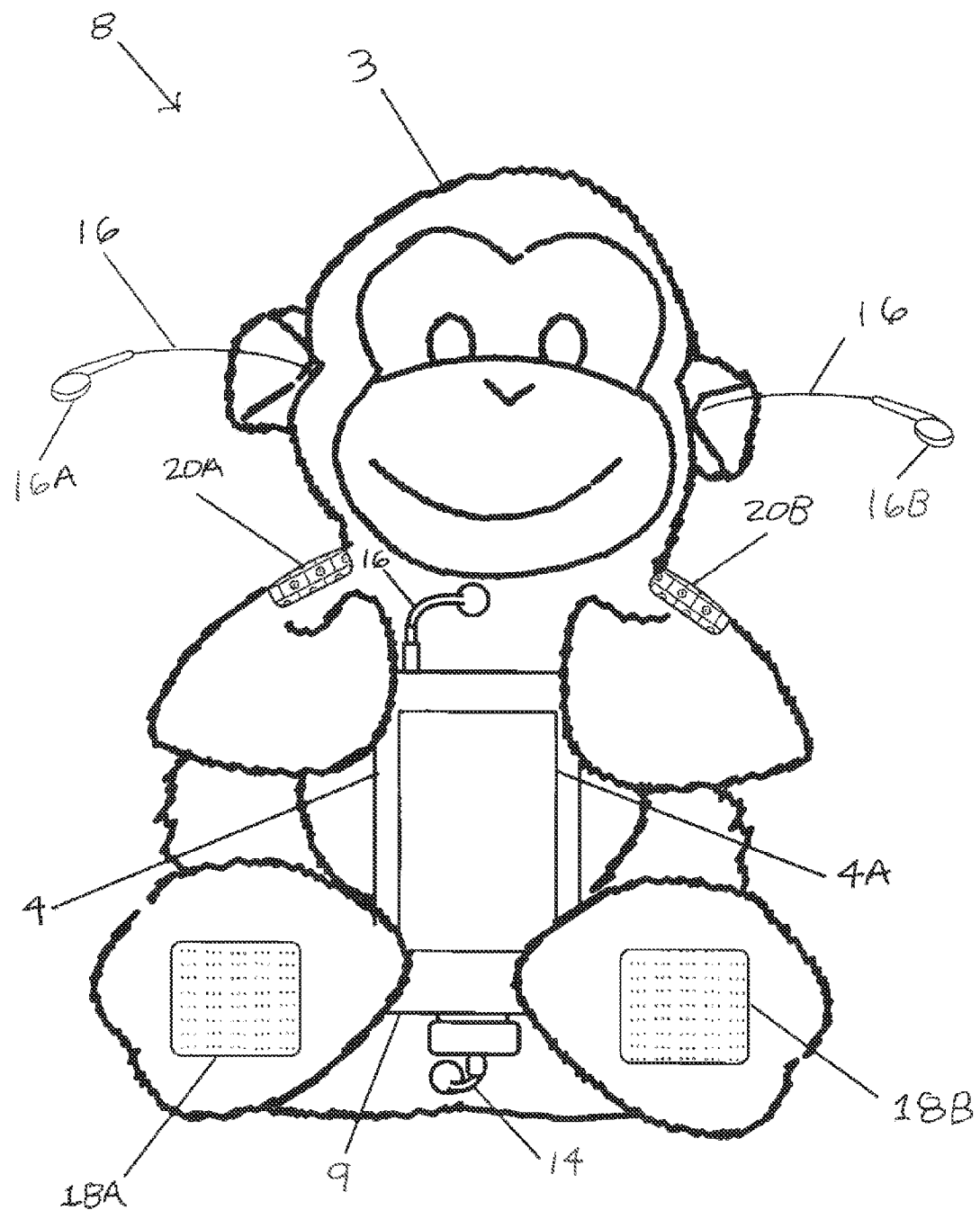
FIG. 1B provides a second version of the invented device further comprising a battery, a power cord to a phone; a pair of ear buds; an audio speaker at each foot pad; and solar panels.
Figure 2:
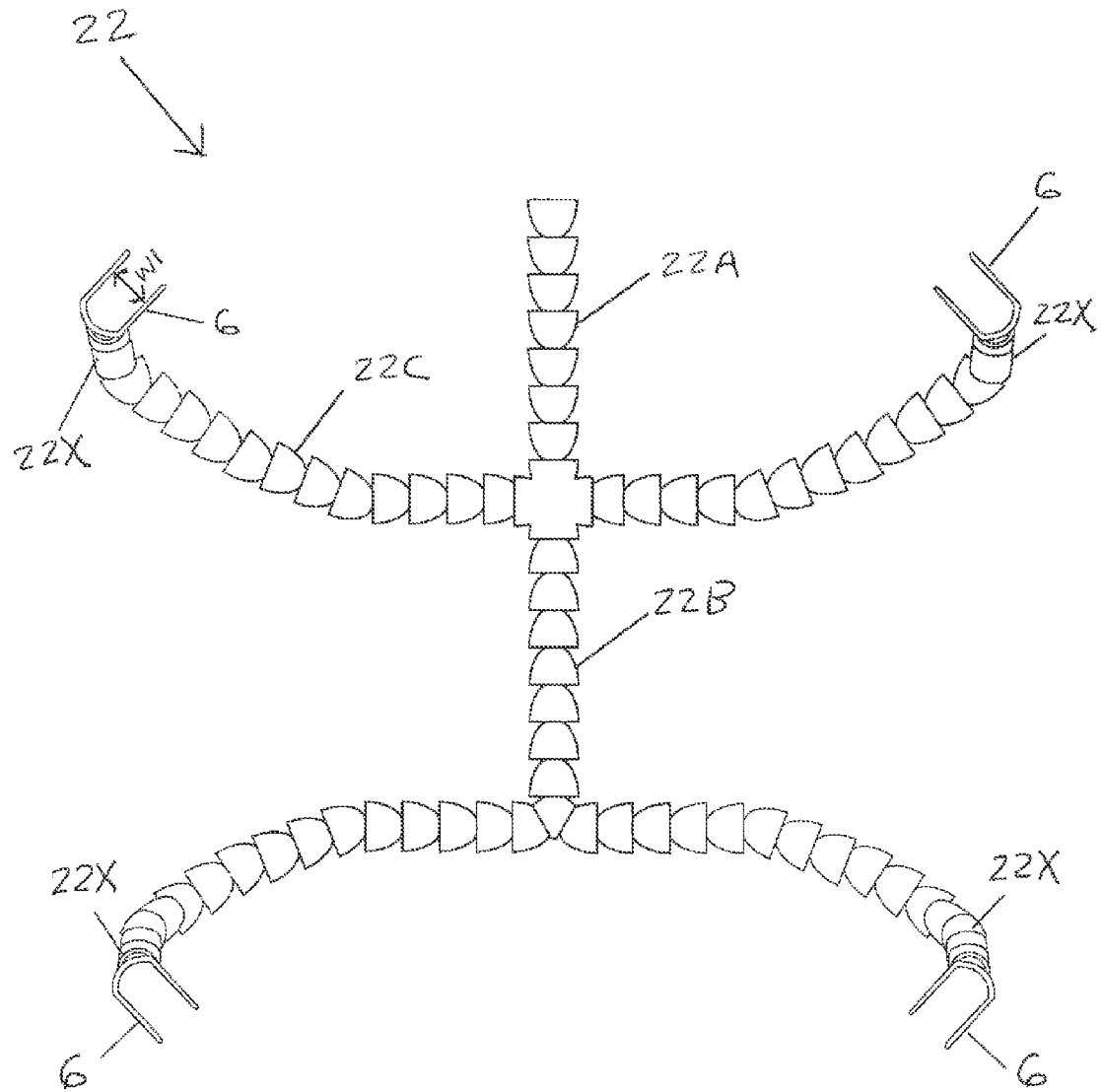
FIG. 2 is a detailed exposed view of an articulating skeleton of the first version of FIG. 1A and the second version of FIG. 1B.
Figure 6:
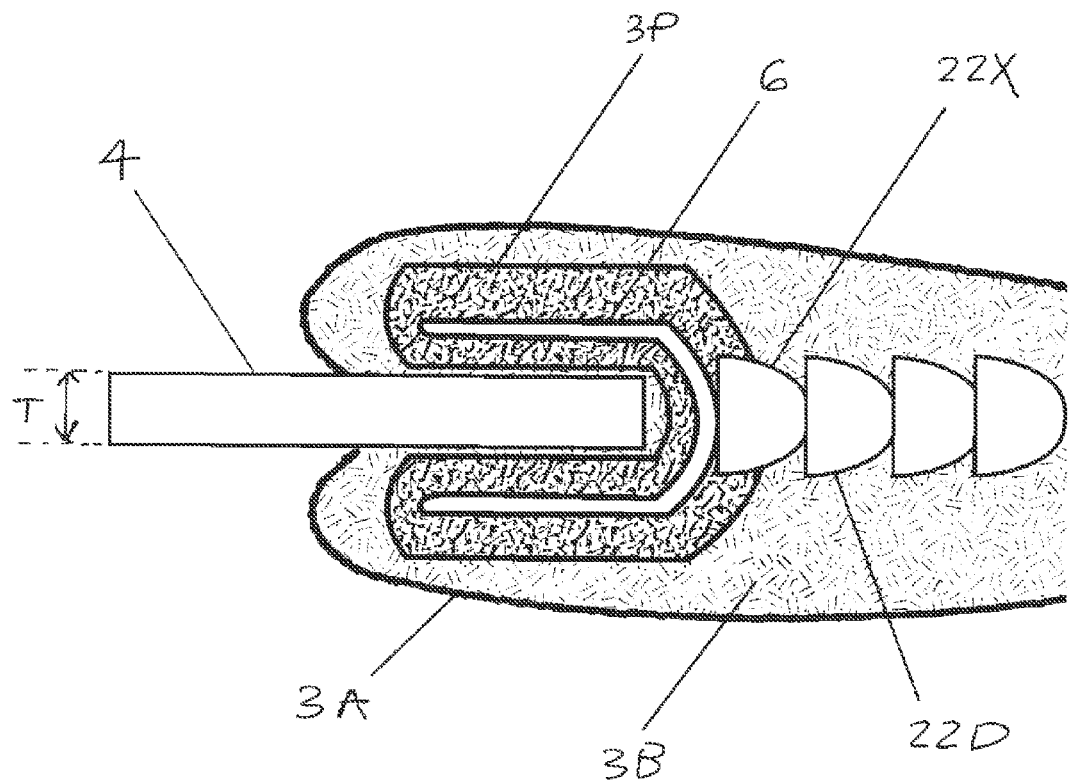
FIG. 6 is a detailed sectional view of U-shaped gripping elements for the phone of FIG. 1A, FIG. 1B and FIG. 2.

The phone 4 is secured and coupled to the figurine 2 by (a.) one or more U-shaped gripping elements 6 as presented more particularly in FIG. 2 and FIG. 6; (b.) one or more corner shaped gripping elements 8 as shown in FIGS. 7, 8, 9 and 10; and/or (c.) a friction fit protective device shell 9, i.e., a protective case 9 of FIG. 1B.

Figure 3:
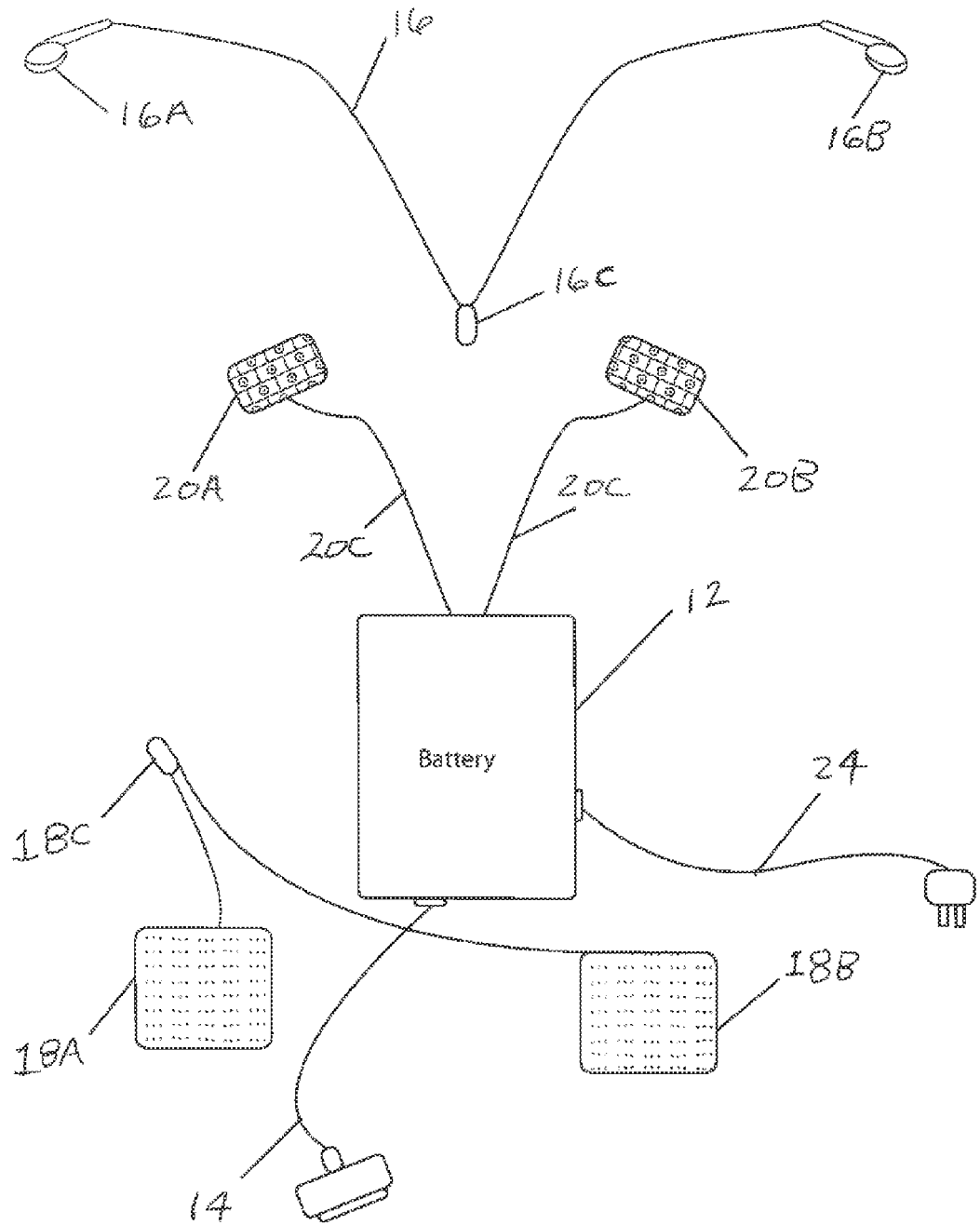
FIG. 3 provides a detailed view of the battery, the power cord to the phone; the pair of ear buds; the audio speakers and the solar panels of the second version of FIG. 1B.
Figure 4:
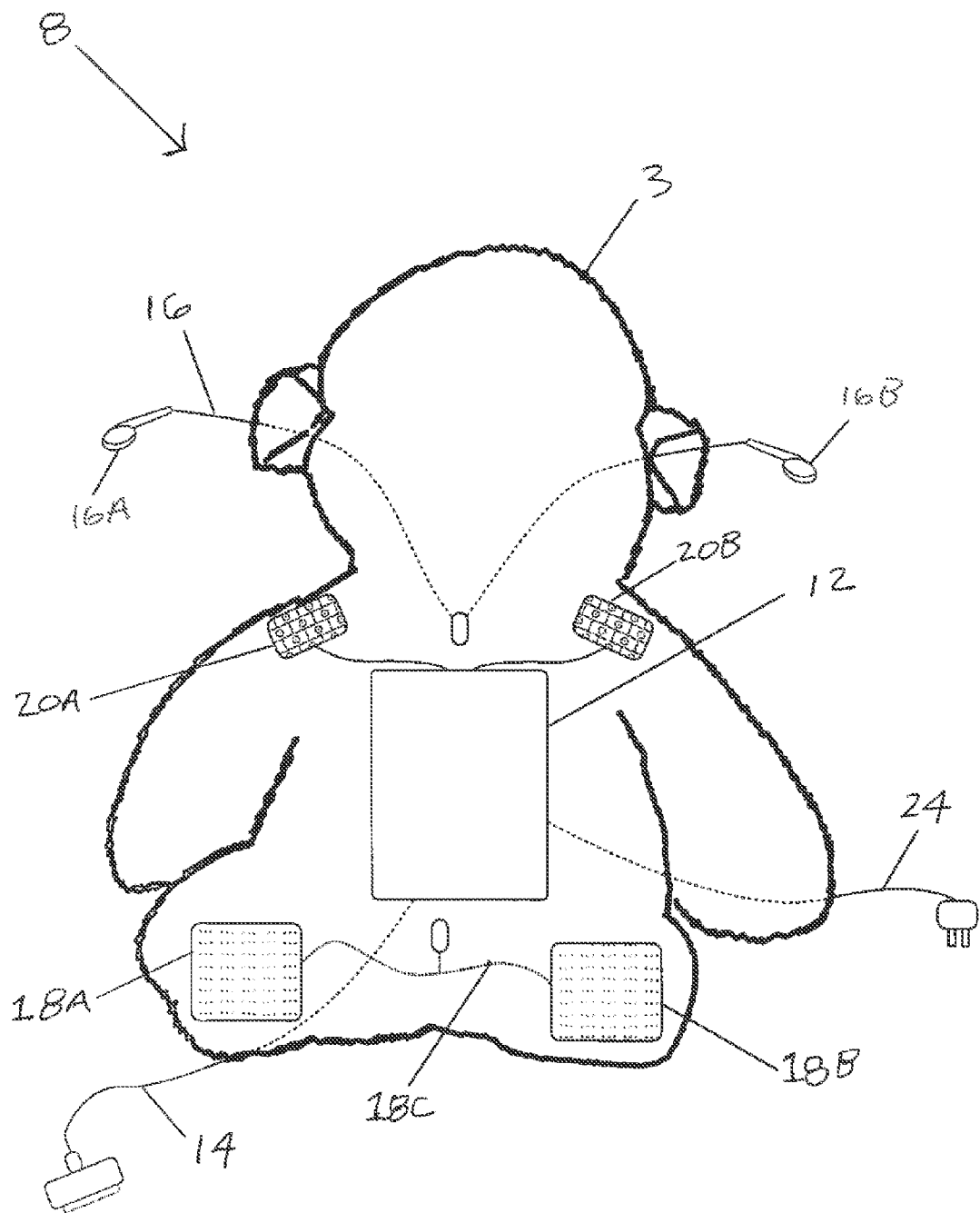
FIG. 4 is a cut away view of the second version of FIG. 2 and showing the electrical elements of FIG. 1B and FIG. 3.
Figure 5:
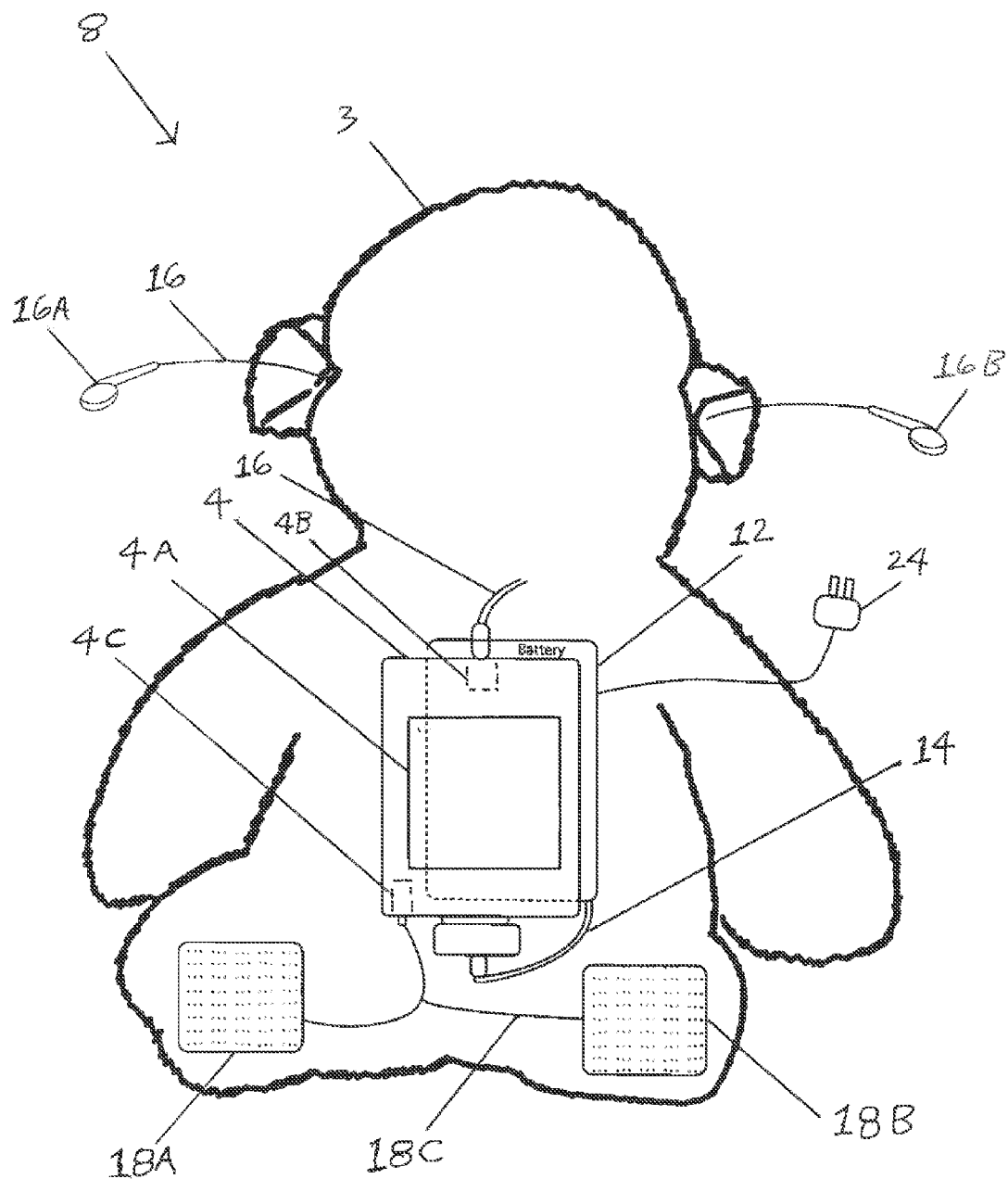
FIG. 5 is cut away view of iPhone attached to the battery of FIG. 3 and FIG. 5 coupled with the phone of FIGS. 1A, 1B, 2 and 4.

FIG. 1B is an external view a second version 8 of the invented device further comprising an enclosed battery 12 (as shown in FIGS. 3 through 5), a power cord 14 leading from the battery 12 and to the phone 4; an audio signal cabling 16 that includes a pair of ear buds 16A & 16B; two separate audio speakers 18A & 18B individually at each foot pad 31 & 3J; and a pair of solar panels 20A & 20B. It is understood that one or both audio speakers 18A & 18B may be directional speakers that generate sound waves having greater intensity along a single axis extending from the emitting speaker 18A or 18B.

The phone 4 is inserted into the friction fit protective device shell 9 and the friction fit protective device shell 9 is disposed in between the phone 4 one or more U-shaped gripping elements 6 and/or one or more corner shaped gripping elements 8. Where the phone 4 is an iPHONE 4S™ cellular telephone, the friction fit protective device shell 9 may be a FEATHER™ friction fit cover as marketed by Incipio Technologies of Irvine, Calif., or other suitable iPHONE™ cellular telephone case or cover known on the art. Alternatively, where the phone 4 is an iPOD 4G TOUCH™ video display device, the friction fit protective device shell 9 may be a DERMASHOT™ case as marketed by INCIPIO Technologies of Irvine, Calif., or other suitable iPOD™ video display device case or cover known on the art. Still alternatively, where the phone 4 is a tablet computer, or other video display device or video-enabled cellular telephone, the protective device case 9 may be adapted to snugly fit around the phone 4 and without substantively reducing visibility of the video screen 4A of the phone 4 of a user or observer. In one exemplary embodiment of the present invention, the second version 8 is adapted to hold an iPAD™ tablet computer and the protective device shell 9 is an iPAD SMART COVER™ protective case as marketed by Apple, Inc. of Cupertino, Calif.

Figure 1C:
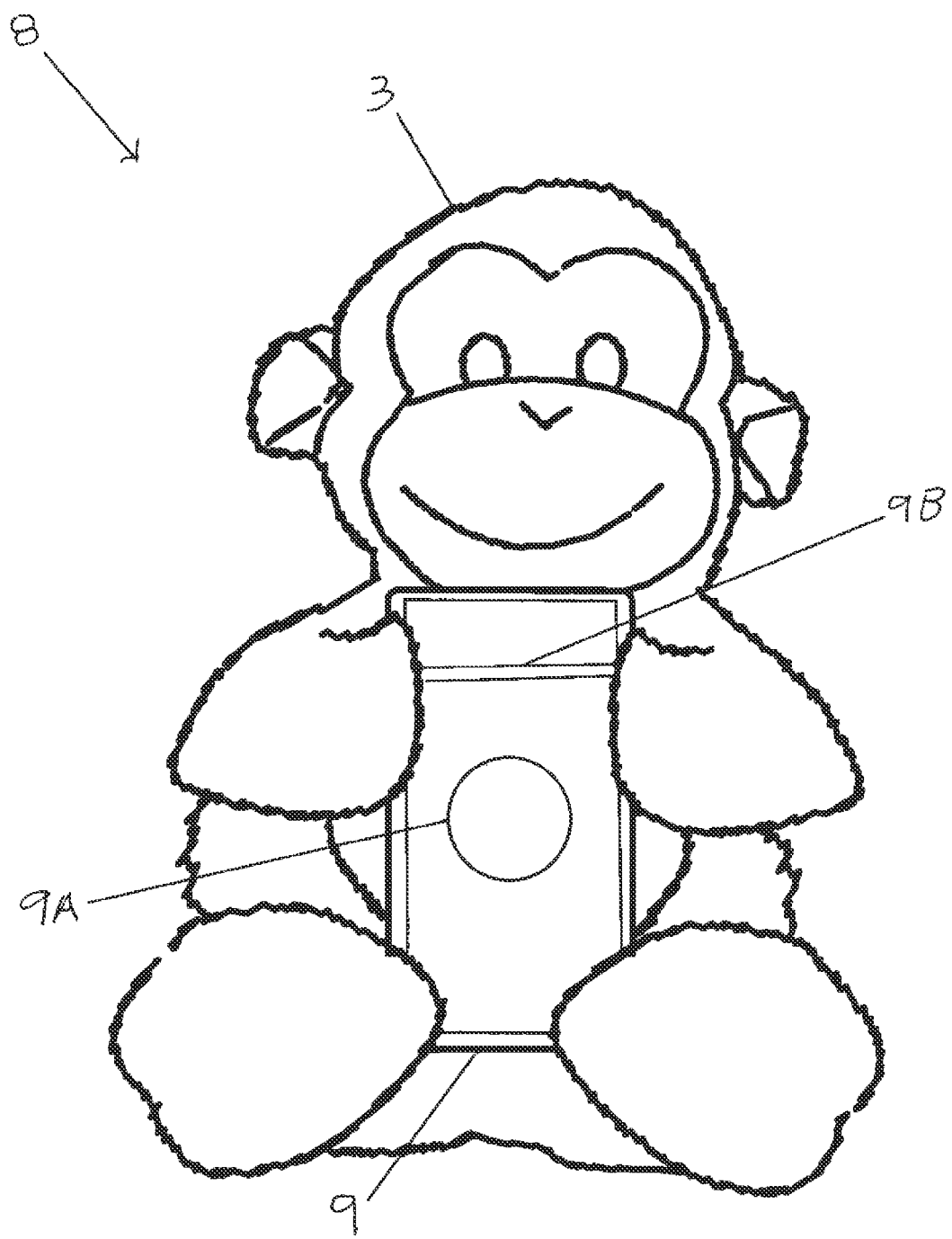
FIG. 1C illustrates the second version of the invented device of FIG. 1B further comprising a protective device shell, a suction cup and an elastic band for maintaining the phone in a position.

FIG. 1C illustrates the second version 8 further showing the friction fit shell 8A, and further comprising an optional suction cup 9A and an optional elastic band 9B. The suction cup 9A and the elastic band 9B are attached to the protective device shell 9. The protective device shell 9 is adapted to accept the phone 4 and maintain the phone 4 under compression and within a friction fit. In the exemplary instance where the phone 4 is an iPHONE 4S™, the protective device shell 9 may be an IPH-620 DELTA HARDSHELL CASE™ as marketed by Incipio Technologies of Irvine, Calif.

It is understood that the phone 4 defines (a.) a front face on which the video display screen 4A is presented, and (b.) an opposite back face. The suction cup 9A is affixed to and positioned on the protective device shell 9 and is further adapted to apply suction force against the device back face to maintain the phone 4 within the protective device shell 9. The elastic band 9B is adapted to cross over the device front face to maintain the phone 4 within the protective device shell 9 and without obstructing a user's view of the video screen 4A.

FIG. 2 is a detailed exposed view of an articulating skeleton 22 of the first version 2 of FIG. 1A and the second version 8 of FIG. 1B. The skeleton 22 is formed with articulated components 22A-22X. One or more articulated components 22A-22X may be or comprise, or be selected from, suitable articulated elements known in the art, to include the ball and socket connector disclosed in U.S. Pat. No. 7,891,615 as a connecter. Alternately, optionally or additionally, one or more components 22A-22X may embody the connector design as disclosed in U.S. Pat. No. D574,700. The skeleton 22 in combination with two or more U-shaped gripping elements 6 and/or one or more corner shaped gripping elements 8 preferably enables the user to position the phone 4 about at least two axes of rotational motion and along at least two axes of linear motion, and more preferably within six degrees of motion, i.e., about at least three mutually orthogonal axes of rotational motion and linearly along the three mutually orthogonal axes.

In some embodiments, surfaces of one or more components 22A-22X may be coated with an adhesive. With some connector materials that may be comprised within one or more components 22A-22X, such as acetyl materials, Delrin, and Nylon, compounds normally used as adhesive may function as a lubricant when used in an interference fit ball and socket joint connector version of one or more components 22A-22X.

The U-shaped gripping elements 6 are shown in FIG. 2 to each be connected to a separate end articulated components 22X. Each U-shaped gripping element 6 is sized and shaped to receive the phone 4 and form a friction fit to enable the phone 4 to be gripped within one or more U-shaped gripping elements 6 while a user manually positions the skeleton 22 within three dimensional space by articulation of one or more of the articulated components 22A-22X. More particularly a U-width W1 of each U-shaped gripping elements 6 is made to be narrower that a thickness T of the phone 4, wherein the U-width W1 is preferably in the range of 0.001 inch to 0.2 inch narrower than the phone thickness T. Each U-shaped gripping element 6 may be or comprise a flexible metal or plastic, such as aluminum, Delrin, and Nylon, or other suitable material known in the art that will support the phone 4 in a static position, and preferably maintain the phone 4 under compressive force.

FIG. 3 provides a detailed view of elements of the second version 8 showing unobstructed front views of the battery 12, the electrically conductive phone power cord 14, the audio signal cabling 16, the audio speakers 18A & 18B, the solar panels 20A & 20B, and an electrically conductive external battery cord 24. The solar panels 20A & 20B, the phone power cord 14 and the external battery cord 24 are all shown in FIG. 3 in electrical connection to the battery 12. The solar panels 20A & 20B collect solar energy and transform the collected solar energy into electric energy. The solar panels 20A & 20B are coupled by transfer cabling 20C to the battery 12 and thereby provide electrical energy to the battery 12. The phone power cord 14 is sized and adapted to transfer electrical power from the battery 12 and to the phone 4. The optionally removable external battery cord 22 is sized and adapted to transfer electrical energy from an electrical power source socket (not shown) of, or electrically coupled to, (a.) a landline electrical power source (not shown), (b.) an electrical power generator (not shown), (c.) an external electrical battery (not shown), (d.) and/pr other suitable sources of electrical energy known in the art.

The earphone audio signal cabling 16 is configured for coupling with the phone 4 and is therefore shown in FIG. 3 as being unattached to any other electrical element of the second version 8. An earphone connector 16C is sized and adapted for insertion into an audio channel socket of the phone 4. Additionally or optionally, a speaker cabling 18C electrically couples each of the two speakers 18A & 18B to a speaker connector 18D. The speaker connector 18D is sized and adapted for insertion into the audio channel socket of the phone 4.

In one exemplary embodiment of the second version 8 and/or the first version 2, where the second version 8 is adapted to couple with an iPHONE 4S™ cellular telephone as marketed by Apple, Inc. of Cupertino, Calif., the earphone audio signal cabling 16 may be or comprise APPLE iPOD EARPHONES™ as marketed by Apple, Inc. of Cupertino, Calif. In the exemplary embodiment of the second version 8 and/or the first version 2, where the second version 8 is adapted to couple with an iPHONE 4S™ cellular telephone as marketed by Apple, Inc. of Cupertino, Calif., the phone power cord 14 may be or comprise APPLE DOCK CONNECTOR TO USN CABLE™ as marketed by Apple, Inc. of Cupertino, Calif.

FIG. 4 is a cut away view of the second version of FIG. 2 and showing the components of FIG. 1B and FIG. 3 in place within the second version 8. The solar panels 20A & 20B, the phone 4 and the external battery cord 22 are all shown in FIG. 3 in electrical connection to the battery 12. The earphones audio signal cabling 18 and the speakers 18A & 18B are configured for coupling with the phone 4 and are therefore shown in FIG. 3 as being unattached to the battery 12 any other electrical element of the second version 8.

FIG. 5 is cut away view of the phone 4 electrically coupled to both the battery 12 and the earphone audio signal cabling 16. The phone 2 is electrically coupled to both the battery 12 and the phone 4 and transfers electrical power from the battery 12 and to the phone 4 in the configuration of FIG. 5. More particularly, the earphone connector 16C is shown to be electrically coupled with an audio channel socket 4B of the phone 4. For the purposes of illustration, the speaker connector 18D is simultaneously indicated in FIG. 5 to be electrically coupled to a second audio output socket 4C of the phone 4. It is understood that where the phone 4 has only one audio output socket 4B, that the simultaneous electrical connection of the earphone connector 16C and the speaker connector 18D is not enabled by the first version 2 or the second version 8.

FIG. 6 is a detailed sectional view of one of the U-shaped gripping elements 6 of the skeleton 22. The U-shaped gripping element 6 is attached to a last articulating element of the skeleton 22, and is optionally at least partially layered with an elastic layer 3P of the first version 2 that accepts the phone 4 and preferably applies compressive pressure against the phone 4 to retain the phone 4 within the U-shaped element 6.

Figure 7:
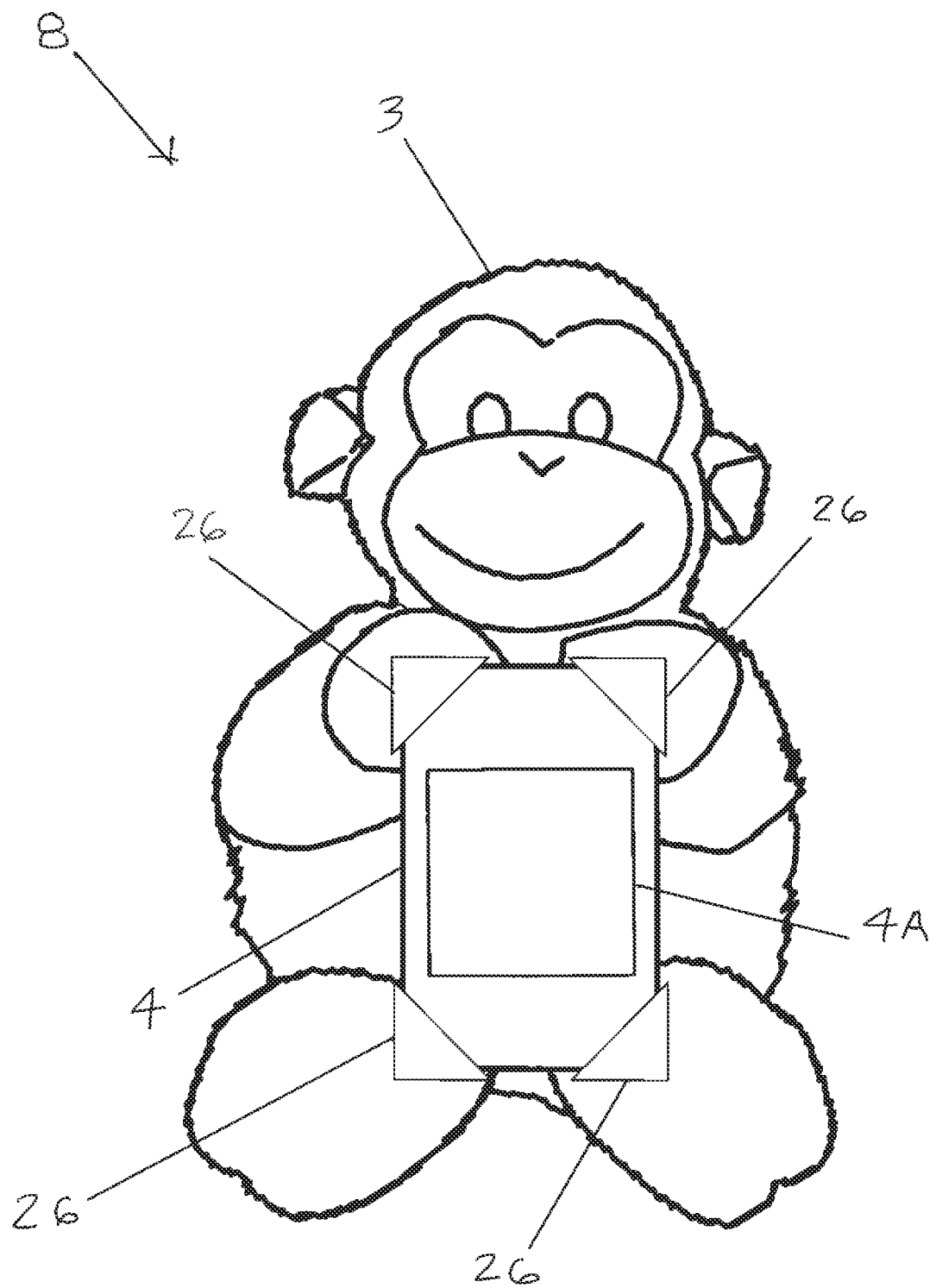
FIG. 7 is an external view of an alternate embodiment of the second version of FIG. 1B, wherein the phone is coupled with the second version by four triangular-shaped corner connectors.

FIG. 7 is an external view of an alternate embodiment of the second version 8, wherein the phone 4 is coupled with the second version 8 by four triangular-shaped corner connectors 26. Each corner connector 26 is separately attached to a unique end connector 22X of the skeleton 22. In certain alternate preferred embodiments of the present invention, the protective device shell 9 is preferably simultaneously positioned within two or more U-shaped gripping elements 6 and/or two or more corner shaped gripping elements 26.

Figure 8:
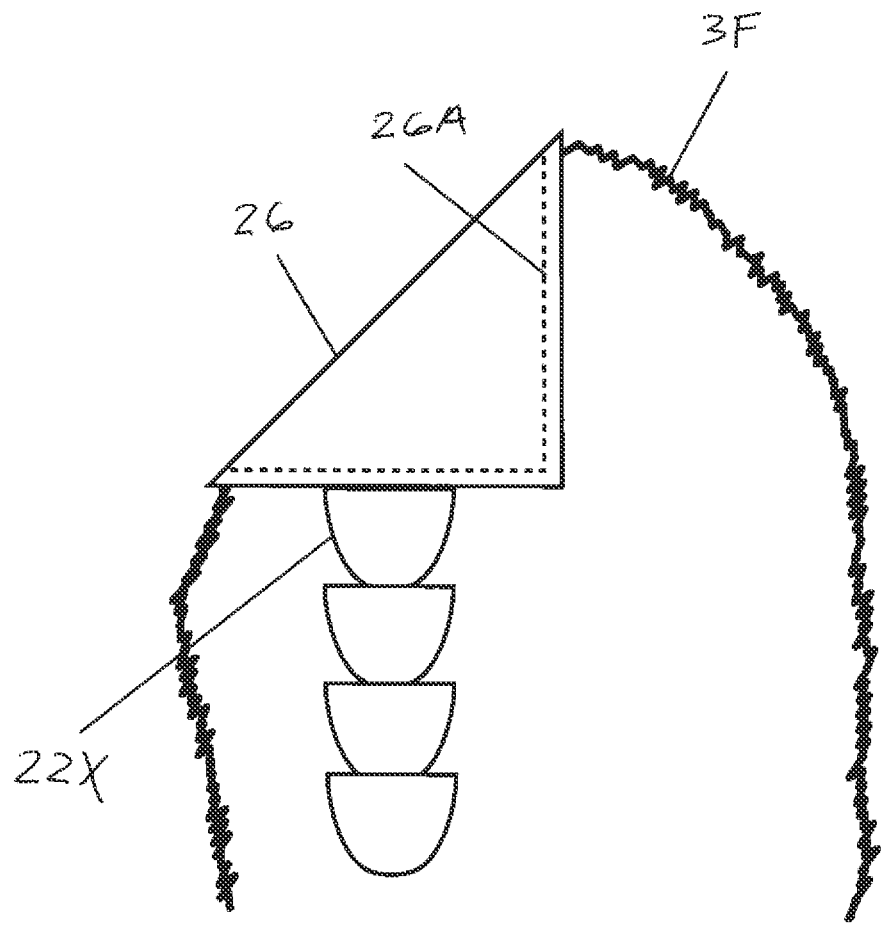
FIG. 8 is a detailed cut-away side view of the alternate embodiment of the second version of FIG. 7 showing one of the four triangular-shaped corner connectors.

FIG. 8 is a detailed cut-away side view of the alternate embodiment of the second version 8 showing one of the four triangular-shaped corner connectors 26. A dotted line imposed within the representation of the corner connector 26 indicates a corner cavity 26A into which a corner of the phone 4 may be inserted. The exemplary corner connector is adhered or affixed to an end articulated component 22X.

FIG. 9 is a cut-away side view of the alternate embodiment of the second version 8 showing the four triangular-shaped corner connectors 26, an external high friction surface 28, and a weighted bag 30. The high friction surface 28 is adapted to resist a sliding of the second version 8 along a smooth surface (not shown). The high friction surface 28 may be sown, adhered and/or otherwise coupled to an outer side of the exterior fabric 3A.

The weighted bag 30 is adapted to support the second version 8 in an upright position, wherein the head region 3C is maintained above the body region 3D, the two individual arm appendages 3E & 3F, and the two individual leg appendages 3G & 3H. The weighted bag 30 includes a bag fabric 30A that encompasses a dense material 30B and is shaped and adapted to maintain the dense material 30B in a combined mass and in isolation from the internal stuffing 3B. The bag fabric 30A may be composed of cotton, nylon, or other suitable organic, inorganic or synthetic material known in the art that may be adapted to maintain the dense material 30B in a single, combined mass.

The dense material 30B is preferably at least twice as dense as either the skeleton 22 and the internal stuffing 3A, and more preferably greater than ten times as dense than either the skeleton 22 and the internal stuffing 3A. The dense material 30B may comprise sand, glass, plastic, glass beads, or other suitable organic, inorganic or synthetic material known in the art.

Figure 10:
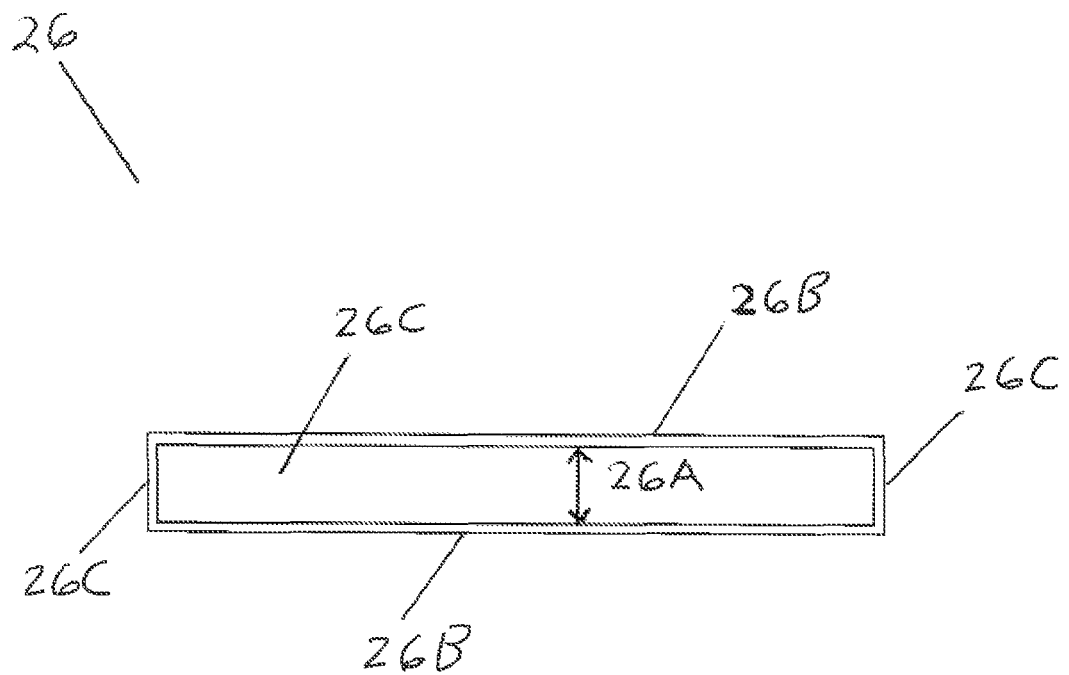
FIG. 10 is a top view of one of the four triangular-shaped corner connectors of FIG. 7.

FIG. 10 is a top view of one of the four triangular-shaped corner connectors 26. A pair of triangular walls 26B are joined with a pair of rectangular walls 26C to form the corner cavity 26A. The corner cavity 26A preferably presents a cavity width W2 that is narrower that the thickness T of the phone 4. The cavity width W2 is preferably in the range of 0.001 inch to 0.2 inch narrower than the phone thickness T. One or more triangular-shaped corner connector 26 may be or comprise a flexible metal or plastic, such as aluminum, Delrin, and Nylon, or other suitable material known in the art that can be adapted to hold the phone 4, and preferably maintain the phone 4 under compressive force.

Figure 11:
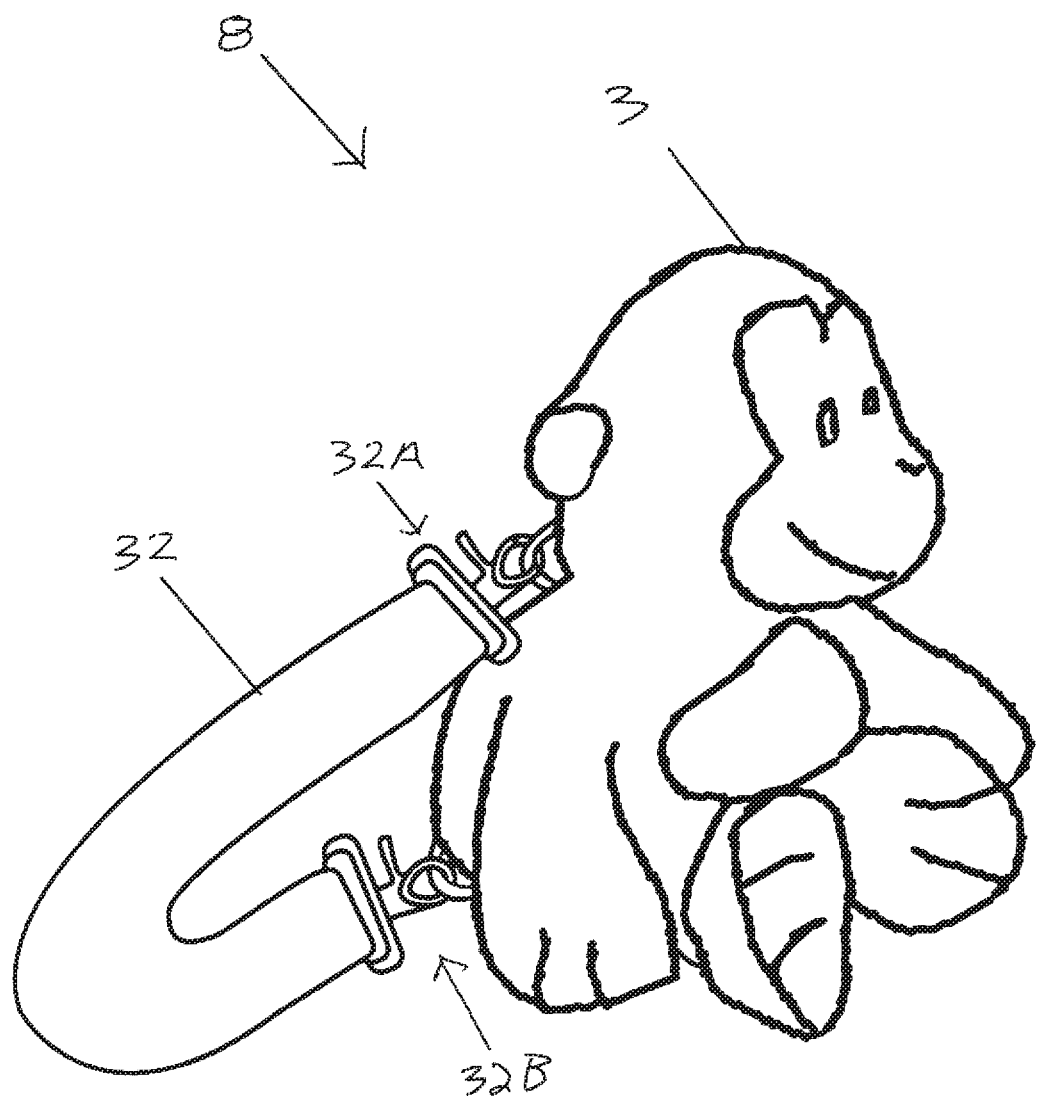
FIG. 11 is an isometric view of the second version of FIG. 1B detachably coupled a carrying strap.

FIG. 11 is an isometric view of the second version 8 further coupled a carrying strap 32. A pair of detachable attachment assemblies 32A & 32B enable a user to alternately attach and detach the carrying strap 32 from the second version 8. The strap 32 may be made from canvas, nylon, cotton, or other suitable flexible strapping material. The pair of detachable attachment assemblies 32A & 32B may be made of a metal, metal alloy, plastic, or other suitable attachment assembly materials known in the art.

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible configurations or aspects of the Present Invention. The examples given should only be interpreted as illustrations of some of the preferred configurations or aspects of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the present invention as disclosed and claimed should, therefore, be determined with reference to the knowledge of one skilled in the art and in light of the disclosures presented above.

We claim:

1. A toy comprising:
   a. a three-dimensional figurine comprising an articulating framework ("the framework"), the framework including at least four gripping elements; and
   b. the at least two gripping elements adapted for securing an electronic video display device ("the device"), the device comprising:
      i. a video display screen adapted for rendering digitized video data;
      ii. a digitized video data file; and
      iii. means to visually render the digitized video data file on the video display screen, whereby video display screen of the electronic video display device is stabilized for viewing the rendering of the digitized video data file.

2. The toy of claim 1, further comprising a second attachment means adapted to secure the figurine to an external object.

3. The toy of claim 1, further comprising an electrical battery and a power interface, the power interface adapted to provide electrical energy from the battery and to the device.

4. The toy of claim 1, further comprising an earphone, the earphone adapted to transfer an audio output of the device to a human ear.

5. The toy of claim 1, wherein the the framework provides at least one rotational degree of freedom to position the device when the device is coupled to the figurine, whereby the video display screen is positionable.

6. The toy of claim 1, wherein the framework provides at least two rotational degrees of freedom to position the device when the device is coupled to the figurine, whereby the video display screen is positionable.

7. The toy of claim 1, wherein the figurine comprises a fabric.

8. The toy of claim 1, wherein the figurine comprises a representation of a head, a representation of a body, and at least two representations of individual limbs.

9. The toy of claim 8, wherein the representation of the body comprises a fabric.

10. The toy of claim 8, wherein at least one representation of an individual limb is adapted to secure the figurine to an external object.

11. The toy of claim 8, further comprising an earphone, the earphone adapted to transfer an audio output of the device to a human ear.

12. The toy of claim 8, further comprising an electrical battery and a power interface, the power interface adapted to provide electrical energy from the battery and to the device.

13. The toy of claim 1, wherein the figurine further comprises an elastic strap, the elastic strap adapted to detachably couple the device to the framework.

14. The toy of claim 1, further comprising a friction fit shell coupled with the framework, the friction fit shell adapted to detachably couple with the device.

15. The toy of claim 1, wherein the attachment means comprises a suction cup.

16. A toy adapted for securing an electronic video display device ("the device"), the device presenting a video display screen, the toy comprising:

a. an articulating frame and a device attachment means; and
   b. the device attachment means comprising at least two gripping elements, the attachment means coupled with the articulating frame and adapted for detachably receiving the device while maintaining substantive exposure of the video display screen of the device.

17. The toy of claim 16, further comprising an audio speaker, the audio speaker adapted to receive electrical signals from the device and emit audio signals derived from the received electrical signals.

18. The toy of claim 17, wherein the audio speaker is adapted to emit the audio signals with directionality, whereby the audio signal is strongest along at least one axis extending from the audio speaker.

19. The toy of claim 16, further comprising a carrying strap, the carrying strap coupled with the frame and the carrying strap adapted to removably secure the toy to a human arm.

20. The toy of claim 16, the frame further comprising a skeleton composed of a plurality of articulating elements.

* * * * *